United States Patent [19]

Stahl et al.

[11] Patent Number: 5,726,103
[45] Date of Patent: Mar. 10, 1998

[54] FIBERS AND FABRICS INCORPORATING LOWER MELTING PROPYLENE POLYMERS

[75] Inventors: Glenn Allan Stahl, Humble; James John McAlpin, Houston, both of Tex.

[73] Assignee: Exxon Chemical Co., Houston, Tex.

[21] Appl. No.: 764,036

[22] Filed: Dec. 12, 1996

Related U.S. Application Data

[63] Continuation of Ser. No. 248,284, May 24, 1994, abandoned.

[51] Int. Cl.$^6$ ............................................. B32B 27/00
[52] U.S. Cl. ........................ 442/59; 428/284; 428/287; 428/298; 428/349; 428/221; 428/224; 428/364
[58] Field of Search ........................... 428/284, 286, 428/298, 296, 403, 287, 288, 411.1, 355, 357, 364, 221, 224, 347, 349, 350; 502/152, 155, 103, 104, 117; 156/182, 272.5, 325; 526/126, 160, 348.6; 556/9, 11, 12

[56] References Cited

U.S. PATENT DOCUMENTS

| | | | |
|---|---|---|---|
| 4,217,386 | 8/1980 | Arons et al. | 428/198 |
| 4,291,092 | 9/1981 | Weiner . | |
| 4,297,411 | 10/1981 | Weiner . | |
| 4,316,970 | 2/1982 | Hughes . | |
| 4,339,469 | 7/1982 | McDonie . | |
| 4,340,641 | 7/1982 | Weiner . | |
| 4,390,385 | 6/1983 | Ferguson . | |
| 4,461,872 | 7/1984 | Su | 525/240 |
| 4,643,945 | 2/1987 | Kiang et al. . | |
| 4,808,561 | 2/1989 | Welborn, Jr. | 502/104 |
| 5,017,714 | 5/1991 | Welborn, Jr. . | |
| 5,055,438 | 10/1991 | Canich . | |
| 5,145,819 | 9/1992 | Winter et al. | 502/117 |
| 5,169,712 | 12/1992 | Tapp | 428/315 |
| 5,188,885 | 2/1993 | Timmons et al. | 428/198 |
| 5,198,401 | 3/1993 | Turner et al. . | |
| 5,213,881 | 5/1993 | Timmons et al. . | |
| 5,240,894 | 8/1993 | Burkhardt et al. . | |
| 5,254,394 | 10/1993 | Bothe et al. . | |
| 5,278,119 | 1/1994 | Turner et al. . | |
| 5,296,434 | 3/1994 | Karl et al. . | |

FOREIGN PATENT DOCUMENTS

| | | |
|---|---|---|
| A-46261/93 | 3/1994 | Australia . |
| 0 129 368 A1 | 12/1984 | European Pat. Off. . |
| 0 318 049 A1 | 11/1988 | European Pat. Off. . |
| 0 320 762 A2 | 6/1989 | European Pat. Off. . |
| 0 495 099 A1 | 12/1989 | European Pat. Off. . |
| 0495099 | 12/1989 | European Pat. Off. . |
| 0 384 264 A1 | 8/1990 | European Pat. Off. . |
| 0 495 099 A1 | 7/1992 | European Pat. Off. . |
| 0 538 749 A1 | 10/1992 | European Pat. Off. . |
| 0538749 | 10/1992 | European Pat. Off. . |
| 0 518 092 A2 | 12/1992 | European Pat. Off. . |
| 0 519 237 A2 | 12/1992 | European Pat. Off. . |
| 0 600 461 A2 | 6/1994 | European Pat. Off. . |

OTHER PUBLICATIONS

*OrganoMetallics*, v. 13, No. 3, 1994, pp. 954–963.
*Journal of Org. Che.*, 288 (1985) 63–67 "Synthesis and Crystal Structure of a Chiral ansa–Zirconocene Derivative with Ethylene-bridged Tetrahydroindenyl Ligands", F. Wild, M. Wasiucionek, G. Huttner and H. Brintzinger.

*Primary Examiner*—Merrick Dixon
*Attorney, Agent, or Firm*—Douglas W. Miller

[57] ABSTRACT

Propylene homopolymers and copolymers formed by metallocene catalyst system exhibit generally lower melting behavior than previous propylene polymers. This lower melting behavior will be of use in the fabrication and use of fibers and fabrics that depend upon either lower melting behavior in general or upon a melting point differential between two fabrics or fibers to achieve bonding. Such fibers are, for instance, chenille or tufted cord, core and sheath. Fabrics such as spunbonded and meltblown, when combined in SM or SMS fabrics will show bonding at lower temperatures with fewer pinholes. Such fabrics may also be bonded by adhesives such as hot melt, water based and extruded polyolefins. Combinations of Ziegler-Natta catalyzed and metallocene catalyzed polymers are contemplated.

9 Claims, 1 Drawing Sheet

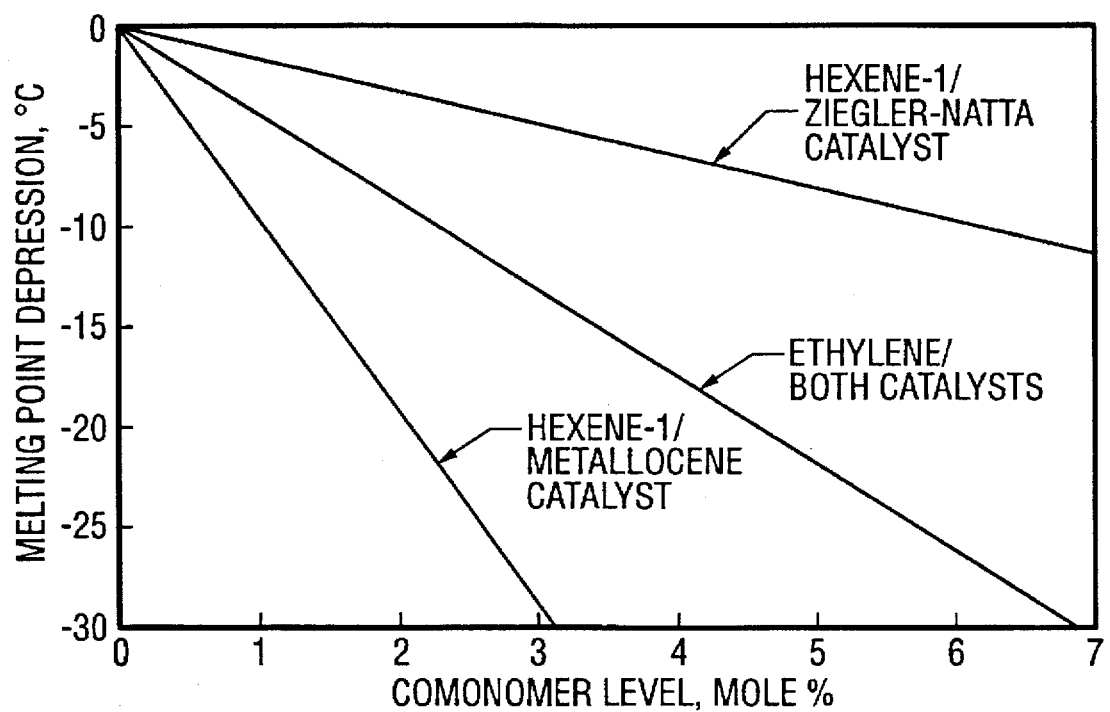

FIBERS AND FABRICS INCORPORATING LOWER MELTING PROPYLENE POLYMERS

This is a continuation of application Ser. No. 08/248,284, filed May 24, 1994, now abandoned.

TECHNICAL FIELD

This invention relates generally to fibers, fabrics and other products and processes for making these products from polymers, specifically propylene homopolymers or propylene copolymers of ethylene and/or α-olefins where the polymers are produced utilizing a metallocene catalyst system. The articles made from the polymers exhibit lower melting points than conventional (Ziegler-Natta catalyzed) homopolymers or conventional (Ziegler-Natta catalyzed) copolymers.

BACKGROUND

Polyolefin polymers are well known articles of commerce. The uses of polyolefins are many and well known to those of ordinary skill in the art. Polyolefins have many useful properties. However, in many fiber, fabric, or similar product applications, conventional (for purposes of this application, conventional will mean Ziegler-Natta catalyzed propylene homopolymers and copolymers) polyolefins have melting points which prevent or substantially limit their use in applications where lower melting points or larger melting point temperature differences would be of advantage.

Polypropylene, homopolymers, and copolymers have come into wide use. Over 2 million tons of polypropylene are manufactured each year in the United States alone. Polypropylene has a wide range of commercial uses from packaging films and sheeting to molded food containers and fibrous constructions employed in diapers and hospital gowns.

There are several classes of polypropylene, one of these classes is statistical copolymers of propylene and other olefins, sometimes also known as random copolymers. In the past, this class has tended to be represented largely by copolymers of propylene and ethylene, usually made using Ziegler-Natta catalyst. Copolymerization of higher alpha-olefins (HAO) (those alpha-olefins of 5 or greater carbon atoms) with propylene using Ziegler-Natta catalyst has been problematic in the past due to the lower reactivity of these catalysts towards the higher alpha-olefins. Ziegler-Natta (Z-N) catalyzed propylene-ethylene copolymers have generally found use based on their substantially different properties when compared to propylene homopolymers (Z-N catalyzed). Broadly the differences between the Ziegler-Natta catalyzed homopolymers and propylene-ethylene copolymers are seen in properties for the copolymer such as lowered melting point, greater flexibility, better clarity, and slightly improved toughness in relation to the homopolymer. In fiber or fabrics the softness of the copolymer in nonwoven diaper coverstock and/or improved resistance to degradation when exposed to high energy radiation, for example gamma rays, ultraviolet, or electron beam, provides it an advantage.

Recently advances in catalysis of polyolefins have lead to different catalysts known as metallocenes:

EP 0 495 099 A1 to Mitsui Petrochemical Industries, discloses a propylene α-olefin copolymer where the propylene is present from 90–99 mole percent and the α-olefin is present from 1–10 mole percent. This document discloses that the propylene α-olefin copolymers would have a narrow molecular weight distribution (Mw/Mn), the copolymer would have a low melting point, and the copolymers have excellent softness. The document discloses a method for polymerization of the propylene α-olefins utilizing metallocene-alumoxane catalyst systems. The document also discloses a straight line relationship between $T_m$ and propylene content, however, no distinction is drawn to the melting point depression effect of different α-olefins.

EP 0 318 049 A1 to Ausimont discloses crystalline copolymers of propylene with minor portions of ethylene and/or α-olefins. The copolymers are disclosed to have very good mechanical properties. The copolymers are polymerized in the presence of methyalumoxane compounds. The examples of this document show propylene-ethylene and propylene-1-butene copolymers.

Also in the past, differences such as lower melting point of Ziegler-Natta propylene-ethylene copolymers have been used to advantage in some fiber and fabric applications. However, two practical limitations have limited such applications. The first is the ability of polypropylene manufacturers to economically incorporate ethylene at above 4–5 weight percent. Commercial products above 5 weight percent ethylene, are not in wide use or production. Second, above about 4 to 5 weight percent ethylene, the copolymer's ability to economically be drawn in to a fiber is substantially diminished.

U.S. Pat. No. 5,188,885 to Kimberly Clark Corporation discloses a fabric laminate that is softer, stronger, more abrasion resistant and has reduced particle emissions compared to fabric laminates that are thermally spot bonded made from isotactic polypropylene. The fabric laminate has at least some layers formed from an olefin copolymer, terpolymer or blends of olefin polymers. Where the olefinic polymers have a crystallinity of less than 45 percent, preferably between 31–35 percent. It is disclosed that such a polymer has a broadened melt temperature range. In an embodiment a random propylene copolymer can be formed by copolymerizing 0.5 to 5 weight percent of ethylene into a propylene backbone, preferred is 3 weight percent ethylene. Further this document discloses that unless a melt temperature differential of about 10° C.–40° C. exists between the spunbonded and melt-blown layers, bonding will not be optimum and strength will be reduced.

In traditional apparel manufacture utilizing nonwoven materials, different types of fabrics and polymers are used to take advantage of the particular areas of strong performance of the different fabric materials. An example of such a difference is in the combination of a spunbond-melt blown-spunbond (SMS) composite laminate or construction commonly used for surgical garments. The middle layer is formed from a melt blown fiber. The melt blown fiber is generally softer and relatively impervious to fluids, however, by itself, it is characterized as being relatively weak (e.g. low tear values). Accordingly, in order to utilize the melt blown layer and its good protection from fluids, such as body fluids during surgery, 1 or usually 2 layers of spunbond material (which is relatively stronger than melt blown fabrics, but relatively porous) are laminated to the layer of melt blown fabric. The laminate achieves properties from both the S and the M layers, that is it is strong (S layer) and substantially impervious to fluids (M layer). This lamination may be accomplished by several techniques. Thermal lamination would be an ideal and inexpensive method of lamination. However, when there is an insufficient melting or softening point temperature difference between the two or more layers, with heat lamination the possibility of "burn through" (commonly known as pinholing) presents the opportunity for voids which would permit the passage of for instance body fluids, which would therefore defeat the protective purpose of the SM or SMS laminate.

Another method of combining these fabrics is by binders or adhesives, specifically hot melt adhesives, water-based adhesives, or melted polymer. Adhesive lamination, while effective, is expensive and often does not result in an optimum fabric. The adhesive must be sprayed, coated, and when water based requires drying. Adhesive laminated fabrics can tend to "boardy" or stiff and potentially uncomfortable or nonfunctional.

Another area where differential melting polymer would be of advantage, would be in the making of so called chenille tufted cord. The production of these types of materials that are synthetic polymers, depends upon extruding fibers of a higher melting material (generally 2 to 3 fibers). These higher melting fibers then are mechanically twisted and heated to give the fibers a permanent twist. Then extra warp or filling fiber is drawn through the loops that result from the mechanical twisting. Then ends or loops of these last fibers are then cut off giving the fiber, fiber bundle, a tuft or "cut pile or pipe cleaner" look. Subsequent to the cutting action, the fiber, fiber bundle, or yarn is then passed over a heated godet which will ideally cause the lower melting fiber in the fiber bundle or yarn to soften or come close to its melting point, ideally, bonding the cut fiber in a substantially transverse direction to the direction of the remainder of the mechanically twisted fibers in the fiber bundle, cord, or yarn. Many low melting polymers have been tried in applications such as this. However, they generally suffer from at least one of two disadvantages. The first of these is cost, for instance, when a polyamide or a polyester is extruded in polyolefin chenille production operation, the cost for the fiber bundle yarn or fabric would be adversely affected by the cost of the non-polyolefin. On the other hand, when lower cost materials, such as polyethylene and ethylene copolymers or even propylene copolymers (high ethylene, Ziegler-Natta), have been used, they often lack the ability to be spun into an acceptable fiber at commercial rates.

There is therefore a need for a polyolefin, specifically a propylene copolymer, that has the ability to be spun or extruded into a fiber and has a sufficiently low melting or softening point in relation to propylene polymers that are available.

SUMMARY OF THE INVENTION

It has been discovered that propylene homopolymers and copolymers produced in the presence of metallocene catalyst systems have lower peak melting point temperature than conventional (Ziegler-Natta catalyzed) homopolymers or copolymers.

This lower melting point behavior of the metallocene catalyzed propylene polymers can be utilized advantageously in a number of ways. Spunbond-melt blown fabrics (SM) may be bonded by using the lower melting point or lower softening point of one polymer versus another when used for the S fabric, the other for the melt blown (M) fabric. However, other combinations are also possible, for example, a higher melting point fiber may be made into a melt blown fabric which has smaller diameter fibers, while a lower melting polymer may be used to form a spunbonded fabric. The combination of the melting point differentials between the two polymers and/or their relative fiber diameter thicknesses, permit bonding of the two such layers that will result in a relatively strong, relatively fluid-impervious fabric.

Further expanding the range of possible combinations is an unexpected melting point depression effect of higher alpha-olefin (HAO) comonomers (5–20 carbon atoms) when compared to the melting point depression of copolymers of propylene and either ethylene or butene (all metallocene catalyzed).

Other combinations, such as chenille fiber cords, and core and sheath fibers will also benefit from lower bonding temperatures and/or fabrication temperatures available from the polymers and fibers made from the polymers of a version of the present invention.

Thus it can be seen that articles made from the polymers of an embodiment of the present invention will be particularly useful in applications and processes where a lower differential softening or melting point is important.

BRIEF DESCRIPTION OF THE DRAWINGS

These and other features, aspects, and advantages of the present invention will become better understood with regard to the following description, appended claims, and accompanying drawings where: FIG. 1 shows the effect of comonomer addition on melting point depression in a propylene alpha-olefin copolymer.

DESCRIPTION OF THE PREFERRED EMBODIMENTS

The present invention concerns certain classes of fabricated polypropylene articles, their manufacture, and their uses. These articles have unique characteristics which make them well suited for use in certain applications. The fibers, fabrics, and articles made therefrom utilize metallocene catalyzed homopolymer propylene and propylene alpha-olefin copolymers that may be spun or extruded through conventional fiber spinning dies and may be then made into either fibers, yarns, fabrics, or combinations thereof. Alternatively, the polymer may be extruded directly into a fabric. The polymer of an embodiment of the present invention can exhibit a lower melting point than other polyolefin fibers with which they may be combined in either yarn or fabrics, most often this yarn or fabric is composed of polypropylene homopolymer or a polypropylene copolymer. A detailed description follows of certain preferred resins for use in fabricating articles within the scope of our invention, and preferred methods of producing these resins and their products.

Those skilled in the art will appreciate that numerous modifications to these preferred embodiments can be made without departing from the scope of the invention. For example, all of the properties of the fibers, yarns, and fabrics are used to exemplify the attributes of the polymers, the polymers have numerous other uses. To the extent that our description is specific, this is solely for the purpose of illustrating the preferred the embodiment of our invention and should not be taken as limiting our invention to these specific embodiments.

The term random or statistical copolymer as used herein shall mean copolymers of propylene and other α-olefins polymerized in a medium which the contents of the various comonomers and other process conditions are maintained substantially constant throughout the course of the reaction. Variations in the composition of the resulting copolymers due to the existence of chemically distinct sites within the catalytic entity or to variations experienced in sequence reactors, as long as the resulting "reactor blend" polymers are miscible in the melt, are accepted in the current definition.

We have discovered that certain metallocene catalyst systems can be used to polymerize propylene statistical resins having properties which are highly desirable for conversion into various products. Generally these resins are isotactic polypropylene statistical copolymers and homopolymers, the copolymers utilize propylene and one or more alpha-olefins. For purposes of this application, the term isotactic is intended to mean a polymer where propylene tacticity distribution will be greater than about 90 percent mmmm pentads, where m is a meso diad, (m is defined as the same relative configuration of methyl groups of two successive monomer units (diad) to each other), preferably in the range of from about 94 to about 98 percent mmmm pentads, most preferably in the range of from about 95 to about 97 percent mmmm pentads, as determined by nuclear magnetic resonance (NMR).

Production of the Resin

The polypropylene homopolymers or copolymers of the present invention are generally produced using supported metallocene catalyst. The copolymers may be produced in a fluidized bed or stirred bed gas phase reactors, slurry or bulk liquid reactors of the tank or loop types. Series, preferably two, bulk boiling liquid pool propylene reactors are preferred.

Specific metallocene-type catalyst are known to be useful for product isotactic olefin polymers may be found in, for example, EP A 485 820, EP A 485 821, EP A 485 822, EP A 485 823 by Winter et al. and U.S. Pat. No. 5,017,867 by Welborn.

These publications are incorporated by references for purpose of the U.S. patent practice.

Various publications describe placing catalyst systems on a support medium and the use of the resulting supported catalyst. These include U.S. Pat. Nos. 5,006,500, 4,925,821, 4,937,217, 4,953,397, 5,086,025, 4,912,075, and 4,937,301 by Chang and U.S. Pat. Nos. 4,808,561, 4,897,455, 5,077,255, 5,124,418, and 4,701,432 by Welborn. All of these are incorporated in the present application by reference for the purpose of U.S. patent practice.

Specific information on the use of support techniques for metallocene catalyst, for use in the preparation of propylene alpha-olefin polymers may be found in U.S. Pat. No. 5,240,894 by Burkhardt, also incorporated by reference for the purpose of U.S. patent practice. While catalysts used for the following examples were employed in a bulk liquid phase polymerization, in commercial use other processes may be used, for example, gas phase, and slurry processes.

As described in the above referenced documents, processes and catalysts can usefully incorporate alpha-olefin comonomers into propylene copolymers in the range of from about 0.2 mole percent to about 6 mole percent, based on the total moles in the copolymers. Above about 6 mole percent the resulting resin will make a fiber oriented film with a melting point too low for many preferred applications. In a preferred embodiment the alpha-olefin comonomer is present in range from about 0.5 to about 3 mole percent. In the most preferred embodiment, the alpha-olefin is present in the range of from about 1 to about 3 mole percent.

In one preferred embodiment, the catalyst system comprises of silicon-bridged bis(substituted 2-methyl-indenyl) zirconiumdichloride or a derivative thereof, methylalumoxane and inorganic support. In another preferred embodiment, dimethylsilyl bis(2-methyl-benzidenyl)zirconiumdichloride is the metallocene of choice. The latter preferred catalyst system was used to generate propylene-ethylene and propylene-hexene resins used in films whose properties are shown in Table I. The film data will be an indicator of gross or polymer properties such as melting point, and will be somewhat indicative of fiber and fabric properties. However, it would be possible to copolymerize most any alpha-olefin of 2 to 20 carbon atoms utilizing these and similar catalyst systems. Other activators in addition to alumoxane are also contemplated.

Further details regarding the preparation of the catalyst system and production of the resin are provided in the examples that follow.

Characteristics of the Resins

In a preferred embodiment the polymers are substantially isotactic in nature. The polymers will generally have a narrow molecular weight distribution (MWD) or $M_w/M_n$ (weight average molecular weight/number average molecular weight), $\leq 5$. Preferably $\leq 3.5$, more preferably $\leq 3$, and most preferably $\leq 2.2$. These MWDs are achieved in the reactor, generally not in a post reaction step. The polymers will exhibit melting points in the range of from about 100° C. to about 145° C., more preferably, in the range of from about 110° C. to about 135° C., most preferably in the range of from about 110° C. to about 130° C.

Useful melt flow rates of the polymers of the present invention are in the range of from about 0.1 to about 5,000 dg/min. In a preferred embodiment in a spun bonded application the melt flow rates are in the range of from about 0.5 to about 100 dg/min. In a most preferred embodiment (for spunbond fibers) the melt flow rates are in the range of from about 10 to about 100 dg/min. In a preferred embodiment for melt blown fabrics, the melt flow will be in the range of from about 1000 to about 2500 dg/min. Melt flow rates are measured by ASTM D-1238 condition L.

In addition to the above characteristics of a resin or an article made from the resin, decreased peak melting points and decreased softening points in addition to a resistance to cold flow, better tenacity, better mechanical capacity, and greater softness are important product attributes.

Articles Made From the Resins

It has been discovered that propylene polymers made in the presence of a metallocene catalyst system offer surprising advantages in applications that depend largely upon a melting point temperature differences ($\Delta T_m$) of two or more polymers to achieve utility.

It is especially in the broad areas of fibers and fabrics where this $\Delta T_m$ is depended upon and where the fibers and fabrics of an embodiment of the present invention will find application.

In an embodiment of the present invention chenille tufted cords, core and sheath fibers, spun bonded-melt blown (SM), and spun bonded-melt blown-spun bonded (SMS), fibers and fabrics are comprised of a metallocene catalyst system catalyzed polypropylene. In any of these applications these metallocene catalyzed homopolymers or copolymers of propylene and an $\alpha$-olefin (for purposes of this application, ethylene and $\alpha$-olefins of 4 to 20 carbon atoms are included) can be used to advantage. This is especially true where the $\Delta T_m$ is large enough or the bonding temperature of one fabric is low enough in relation to the softening point temperature of the other fabric, to achieve a bond without damaging the integrity (pin-holing) of the fabric. This can perhaps be best illustrated in commonly used techniques to bond SM or SMS fabrics. It is known that a useful SMS laminate will use a center or core layer of melt blown fibers, commercially this is often a conventional homopolypropylene. Also known is using spunbonded (S) fabric made from conventional random propylene-ethylene copolymer where the ethylene is present at about 3 weight percent based on the total weight of the polymer. Such a fabric construction will generally be weaker than the fabrics disclosed herein as embodiments of the present invention. This is due to the generally higher bonding temperatures required.

The melting point profile of the resins of a typical structure is:

| | |
|---|---|
| S | 144° C. |
| M | 161° C. |
| S | 144° C. |

When the structure is heat laminated or calendared it might be expected that the outer layers would soften/melt to provide the bond, but in fact this probably does not happen. The very fine (low diameter) of the M layer fiber causes it to soften before the S layers and bond to the fibers of the S layer(s) before softening or melting of the fibers of the S layer.

The lower bond temperatures resulting from lower softening and/or melting points are especially useful in spunbonded melt blown (SM) or in spunbond, melt blown, spunbond (SMS) fabric structures, permitting bonding substantially free from burn-through of the melt blown layer. Fiber diameters also have an effect on bonding temperatures.

The advantages of the fibers and fabrics disclosed as an embodiment of the present invention can be achieved in many potential combinations. These include, but are not limited to:
  a) SM or SMS fabrics or combinations containing such fabrics. These will include both heat laminated (calendared) and binder or adhesive laminated fabrics;
  b) chenille tuned cord; and
  c) core and sheath fibers.

These new propylene polymers can enable those of ordinary skill in the art to use the peak melting point temperature $T_m$ as measured by a Differential Scanning Calorimeter (DSC) in relation to peak melting points of other polymers, to fabricate useful and novel articles.

Two important fundamentals are, $\Delta T_m$ and $T_B$. The $\Delta T_m$ is a fairly straightforward measure of the difference in melting point between 2 polymers. The bond temperature $T_B$ of a polymer is that temperature, generally between its softening point and its melting point, where it will form a bond (mechanical or physical) with another fiber, the other fiber being either polymeric or non-polymeric. The opportunity to bond various fiber and fabric combinations is substantial. Those of ordinary skill in the art will appreciate the combinations possible, from the wide range of melting temperatures shown below, understanding that the ability of a polymer to make a fiber is also of importance.

TABLE A

Typical Melting Points $T_m$

| Resin | | | $T_m$ °C. |
|---|---|---|---|
| Conventional | Z—N PP | (homopolymer) | 161 |
| Conventional | Z—N RCP | (random copolymer) | |
| | | 3 (ethylene wt %) | 144 |
| | | 5 (ethylene wt %) | 133 |
| Metallocene | PP | (homopolymer) | 145 |
| Metallocene | RCP | 3 (ethylene wt %) | 124 |
| | RCP | 5 (ethylene wt %) | 109 |
| | | 3 (hexene wt. %) | 124 |
| | | 5 (hexene wt %) | 110 |

The above typical melting points are those of "neat" or polymers without additives or blend components that may effect the melting point.

Some possible combinations for the SM or SMS embodiments follow.

1) A SM or SMS fabric where the spunbond fabric is made of a material that has a lower $T_m$ or lower bond temperature relative to the melt blown fabric. This could be achieved in several ways. These include, but are not limited to:
  1) M=conventional (Ziegler-Natta catalyzed) polypropylene homopolymer
     S=propylene copolymer (metallocene catalyzed)
  2) M=conventional copolymer
     S=metallocene catalyzed copolymer
  3) M=metallocene catalyzed copolymer
     S=metallocene catalyzed copolymer
  4) M=metallocene catalyzed copolymer
     S=conventional copolymer
  5) M=conventional copolymers
     S=metallocene catalyzed homopolymer
  6) M=metallocene catalyzed homopolymer
     S=metallocene catalyzed copolymer
  7) M=conventional homopolymer
     S=metallocene catalyzed homopolymer.

Those of ordinary skill in the art can use the known principles of using the finer (lower) denier fiber formed melt blown fabric to achieve relative low fluid permeability and lower bonding temperatures, when compared to the thicker fiber formed (higher denier) spunbond fabric, to achieve the desired strong, fluid impermeable fabric. At least two techniques of combining the fabrics are possible:
  a) heat laminating (calendaring)
  b) binder or adhesive lamination.

In these and other embodiments, it will be understood by those of ordinary skill in the art that additives and blend components may be added to the polymers discussed in this application. Such additions may effect, for example, physical properties, and such additions are also contemplated.

Heat Laminating

To achieve an effective heat laminated structure (SM or SMS, for example), minimum differences in bond temperatures must be achieved to prevent pin-holing. Thermally bonded fabrics can be made by many techniques. These include, but are not limited to: point bond calendaring, bar sealing, nip rolls, radio frequency, hot air and sonic wave sealers. The melting points disclosed in Table A will permit those of ordinary skill in the art to pick from the available homopolymers and copolymers to achieve a viable lamination.

Binder Lamination

Using a low melting point (in relation to the bonding temperatures of the S and M layers) fiber or polymer melt as a binder, the binder could be a nonwoven fabric, a fiber or a film that would be sprayed, coextruded, or distributed into a layer to be formed between S and M layers, and if necessary subsequently laminated. Within the broad melting and softening point differences between on the one hand conventional propylene homopolymers (Ziegler-Natta catalyzed) (high melting ~161° C.) and on the other hand high comonomer content (higher α-olefin) (low melting ~121° C.) propylene copolymers (catalyzed with metallocene catalysts) on the other hand, those of ordinary skill in the art have a wide selection of polymers that will form fibers, to choose from.

Articles made from metallocene catalyzed homopolymers and copolymers will be particularly useful in such articles due to the propylene polymers lower peak melting points.

Making Oriented Fibers and Fabrics

In an embodiment of the present invention, novel fibers may be formed by any method in which a fiber is formed from a molten polymer including traditional melt spinning of the fibers as yarns as well as spunbonding processes, and melt blowing, or by nontraditional methods including centrifugal spinning, sheet slitting, and film fibrillation.

The fabric will be stronger than a similar fabric made from a polymer or polymer combinations catalyzed by Ziegler-Natta catalyst system. Additionally fibers made by blending other thermoplastic polymers with a metallocene catalyzed propylene polymers and/or fibers made with various additives including pigments, anti-static agents, antioxidants, or other additives are also contemplated. These tougher, stronger, creep resistant, lower melting fibers and fabrics made from them may be used to make textiles such as knitted woven and nonwoven fabrics, particularly SMS, knitted fabric, staple fiber, monofilaments, fiber, nonwovens, randomly dispersed, spun bonded, melt blown, and other techniques that will be apparent to those of ordinary skill in the art.

Also contemplated as useful products utilizing the polymers of a version of the present invention, are side-by-side fiber extrusions where one fiber would be a higher melting material made with any suitable resin, and the second fiber being a lower melting material of an embodiment of the present invention. Also contemplated is a core sheath extrusion where the core would be a higher melting fiber forming polymer and the sheath would be a lower melting fiber forming metallocene catalyzed propylene copolymer of a version of the present invention. Such binary fiber bundles or core sheath fibers would exhibit superior properties in a single nonwoven fabric. These properties would be achieved by applying enough heat to the fabric to soften and bond the lower melting component but not enough heat to melt or deform the entire fabric or fiber. The softening or melting of the lower melting constituent would provide a tie point to improve the strength of a single-ply fabric. Laminates of such a fabric, either to itself or to other woven or nonwoven, are also contemplated.

EXAMPLE 1

Preparation of Metallocene Catalyst

A silica supported metallocene catalyst was prepared according to the teachings of U.S. Pat. No. 5,240,894 using dimethyl silyl, bis(2 methyl, 4,5 benzene indenyl) zirconium dichloride as the metallocene as disclosed in *Organometallics*, V. 13, No. 3, 1994, P 954–963. The catalyst recipe was 400 grams of silica (Davison 948), 10 grams of metallocene and 3 liters of 10 weight percent MAO in toluene solution. Approximately 600 grams of the finished catalyst system was recovered. This catalyst was prepolymerized with one weight of ethylene per weight of catalyst system at a temperature of about 15° C. The ethylene was added over a period of 1.5 hours to assure slow reaction rate.

EXAMPLE 2

Preparation of Propylene-Ethylene Copolymers

Approximately 15 grams of ethylene and 550 grams of propylene were added to an autoclave maintained at 30° C. After allowing time for equilibration, 0.2 grams of the prepolymerized catalyst of example 1 was added to the reactor and the temperature raised to 50° C. over a period of several minutes. An immediate reaction was observed. The reaction was terminated after 30 minutes to limit the extent of conversion of the ethylene so that its concentration in the reaction medium would be nearly constant over the period of the reaction. A total of 114 grams of propylene-ethylene statistical copolymer was obtained. Its weight average molecular weight as measured by size exclusion chromatography was 184,000, its ethylene content (measured by FTIR) was 3.3 weight percent, and its peak melting point was 121° C.

EXAMPLE 3

Preparation of Propylene-Hexene Copolymers

To the autoclave of Example 2 was added 550 grams of propylene and 34 grams of hexene-1. The catalyst of Example 1 was added (0.2 grams) and the temperature controlled as in Example 2. The reaction was allowed to run for a total of two hours in this case since the relative reactivities of propylene and hexene-1 are nearly the same under these conditions. A total of 222 grams of propylene-hexene statistical copolymer was obtained. Its weight average molecular weight as measured by size exclusion chromatography was 204,000, its hexene-1 content was 2.9 weight percent (measured by FTIR), and its peak melting point was 126° C.

EXAMPLE 4 (Prospective Example)

Preparation of Propylene 1-Octene Copolymers

To the autoclave of Example 2,550 grams of propylene would be added along with approximately 45 grams of 1-octene as the molar amount of Example 3. The catalyst of Example 1 would be added and the temperature would be controlled as in Example 2. The reaction would be allowed to run for 2–3 hours as the reactivities of propylene and 1-octene would be nearly the same under these conditions. Over 200 grams of propylene-octene statistical copolymers could be expected. The average molecular weight as measured by size exclusion chromatography would be expected to exceed 200,000. The octene-1 content would be expected to be about 4 weight percent (if measured by FTIR), and its peak melting point would be expected to be in the range of 125°–130° C.

EXAMPLE 5 (Prospective Example)

Production of Fibers

Fiber and Fabric Formation Examples

Fibers are prepared as spun, partially oriented yarns (POY) by mechanical take-up of the fiber bundle or fully oriented yarns (FOY) by mechanical draw after POY spinning from its extruded melt. This is accomplished on a fiberline assembled by J. J. Jenkins, Inc. (Stallings, N.C.). The line consists of a 5 cm (2 inch) Davis Standard Extruder (with 30:1 length/diameter ratio) and 6 cc/rev Zenith metering pump forcing molten polymer through a spinneret plate of 72 holes of 0.6 mm and 1.2 length/diameter ratio. A metering pump rate of 10 rpm is employed which will yield a through-put of 0.625 g/hole/minute.

Fibers are drawn from the 232° C. (450° F.) melt by an axially spinning unheated godet at 2000 m/min. The fiber bundle, expressed as total denier/total filaments collected at each rate was 203/72. The fiber bundles are collected for characterization as five minute runs by Leesona winder.

The fiber bundle tenacity (g/denier) and elongation are measured by pulling to break on an Instron. Fiber testing is performed on an Instron machine, Model 1122 coupled with the Instron computer which supports the Sintech Sima (Testworks II~) computerized system for material testing. Instron Pneumatic Cord and Yarn Grips (Model 2714) are used for gripping the samples. A sample with 2.5 cm (1 inch)

gauge and 0.1 gram preload is pulled at 500 mm/min to break. Break sensitivity was 95 percent drop in force.

Fibers are melt spun from both a 22 and a 100 MFR polypropylene copolymer. These are materials which are produced by previously described metallocene-type catalysis. Fibers spun from a traditionally catalyzed polypropylene randon copolymers containing 3 percent ethylene which is subjected to controlled theology treatment (post-reactor oxidative degradation) having 33 MFR (Exxon Chemical Company, PD-9355) and will serve for comparison. Results obtained from tenacity and elongation testing of those fibers which are spun with take-up rates of 2000 m/min.

EXAMPLE 6 (Prospective Examples)

Spunbonding Procedure

Spunbonded nonwoven fabric layers of multilayer SM fabrics are prepared on a one meter Reicofil Spunbond line made by the Reifenhauser GMBH of Troisdorf, Germany. The Reicofil employs a 7 cm (2.75 in.) extruder with a 30:1 length:diameter ratio. There are 3719 die plate holes, each having a diameter of 0.4 mm with L/D=4/1.

The spunbonding process is one which is well known in the art of fabric production. Generally, continuous fibers are extruded, laid on an endless belt, and then bonded to each other, and to a second layer such as a melt blown layer, often by a heated calendar roll, or addition of a binder. An overview of spunbonding may be obtained from L. C. Wadsworth and B. C. Goswami, Nonwoven Fabrics: "Spunbonded and Melt Blown Processes" proceedings *Eight Annual Nonwovens Workshop*, Jul. 30–Aug. 3, 1990, sponsored by TANDEC, University of Tennessee, Knoxville, Tenn.

In the following prospective examples, spunbond layers of 17 g/m$^2$ (0.50 oz/yd$^2$) are prepared. The processing conditions are typical of those employed in Reicofil operation. They include a 400° F. (205° C.) die melt temperature, 45°–50° F. (6°–10° C.) cooling air temperature, and a 21 m/min belt speed.

Melt Blowing Procedure

Melt blown fabric layers are prepared employing a 51 cm (20 inch) Accurate Products Melt Blown line built by Accuweb Meltblown Systems of Hillside, N.J. The extruder is a 5 cm (2 in.) Davis Standard with a 30:1 length:diameter ratio. The die nozzle has 501 die holes. The diameter of each being 0.4 mm (0.15 in.). Die length is 15:1 and the air gap is set to 0.15 mm (0.060 in.). Melt blown fabric layers are prepared with weights of about 30 g/m$^2$ (0.88 oz/yd$^2$).

Representative processing conditions include a polymer melt temperature of 500° F. (260° C.) and an air temperature of 500° F. (260° C.).

The technology of preparing melt blown fabrics is also well known in the art of nonwoven fabric preparation production. An overview of the process may be obtained from "Melt Blown Process", *Melt Blown Technology Today*, Miller Freeman Publications, Inc. San Francisco, Calif., 1989, pps. 7–12.

Optimum Bonding Temperature Determination

The Optimum Bonding Temperature (OBT) is found by evaluation of the thermal bonding curve. The OBT is the point-bond calendar temperature at which the peak bonding strength for a laminated nonwoven fabric is developed. The thermal bonding curve and OBT is determined in two steps.

1. Unbonded fabric laminates are passed thru the nip of progressively warmer calendar rolls. The rolls are heated at temperatures between 200° F. (94° C.) and 300° F. (150° C.) in 5° F. (~2.8° C.) increments. A series of fabric samples each bonded at a different temperature is produced 2. The machine direction (MD) and transverse direction (TD) tensile strengths are then measured as set forth in ASTM D 1682–64 (reapproved 1975). The bonding curves are graphic comparisons of calendar temperature and peak bond strength in MD and TD.

Comparison of bonding temperature and peak bond strength on the bonding curves permits identification of the OBT.

Control Resins

In the examples which follow, a commercial 35 dg/min mfr controlled rheology polypropylene is employed in preparation of control spunbonded fabrics. The specific polymer is PP-3445 available from Exxon Chemical Company, Houston, Tex.

Control melt blown fabrics are prepared from PD3435G also available from Exxon Chemical Company. PD3435G is a peroxide coated granular polypropylene with mfr of about 1100 dg/min.

Preparation of SM Fabrics Laminated with Copolymers Prepared with Metallocene Catalysts (Prospective)

An unbonded, bilayer (SM) control fabric consisting of a spunbonded layer (S) and a melt blown layer (M) is prepared. The M layer, made with the commercial 1100 mfr polypropylene, is directly extruded on the web of the S-layer. The latter is made from the 35 mfr commercial polypropylene. OBT of the bilayer fabric is then evaluated by point bonding of the control fabric with heated calendar rolls and subsequent preparation and analysis of a thermal bonding curve.

Additional unbonded SM fabrics are prepared. These fabrics contained a second melt blown layer (10 g/m$^2$ or 0.30 oz/yd$^2$) of the polymers of Examples 2, 3, and 4 respectively, and would be extruded between the S and M layers formed of commercial polypropylenes. The OBT of these fabrics would be evaluated, and the results are given in Table B.

TABLE B

| Example | Polymer of Invention | Optimum Bonding Temperature, °C. | Anticipated Strength, Barrier and Filtration Properties |
|---|---|---|---|
| Control | none | 143 | good |
| 6 | Propylene-co-Ethylene | 98 | excellent |
| 7 | Propylene-co-hexene-1- | 105 | excellent |
| 8 | Propylene-co-octene-1 | 110 | excellent |

As shown, the OBT of the examples of the invention bond at temperatures lower than the commercial control. Excellent barrier and filtration properties are anticipated for the polymers of the invention since the OBT is sufficiently low to do no damage to the small thermally sensitive fibrils of the melt blown layer. Furthermore, since the spunbonded layer in Examples 6 thru 8 is the commercial 35 mfr polypropylene the overall fabric strength will be as high as the control.

Preparation of SM Fabrics Containing One Layer of a Polypropylene Prepared from Metallocene Catalysts (Prospective)

As previously described, control SM laminated fabrics of the commercial 35 mfr polypropylene (S layer) and the commercial 1100 mfr polypropylene are prepared and evaluated for OBT.

An additional SM laminate fabric is prepared. The S layer of this fabric is made with the polyproplene of Example 5. Subsequent addition of a melt blown, M layer, of the commercial 1100 mfr polypropylene would complete this fabric. The fabric is evaluated for OBT as previously described. The results are summarized in Table C.

TABLE C

| Example | Polymer of Invention | Optimum Bonding Temperature, °C. | Anticipated Strength, Barrier and Filtration Properties |
|---------|---------------------|----------------------------------|---------------------------------------------------------|
| Control | none | 143 | good |
| Example 9 | Poylpropylene | 132 | excellent |

As shown, the OBT of the example of this invention has a lower OBT than the control. Yet, improved barrier and filtration properties are anticipated for the polymer of the invention since a lower OBT is employed. Despite the use of reduced OBT, application of a homopolymer of propylene as the S layer will result in no loss of laminated fabric strength.

We claim:

1. A composite fabric comprising at least two layers:
   a) at least a first layer being a melt blown polymer fabric; and
   b) at least a second layer being a spunbond polymer fabric;
      wherein said fabrics a) and b) differ in $T_m$ by at least 10° C.;
      wherein at least one of said polymers of said first or said second layers is a propylene polymer having an $M_w/M_n \leq 3$, as polymerized, and a propylene tacticity distribution greater than about 90 percent mmmm pentads.

2. The composite fabric of claim 1 wherein at least both said first and said second layer polymers are propylene polymers.

3. The composite fabric of claim 1 or 2 wherein said propylene polymer or propylene polymers have a $M_w/M_n \leq 2.2$, as polymerized, and a propylene tacticity distribution from about 94 to about 98 percent mmmm pentads.

4. The composite fabric of claim 1 or 2 wherein at least one of said polymers is a propylene copolymer comprising propylene and at least one comonomer selected from the group consisting of 2 to 20 carbon atoms.

5. The composite fabric of claim 1 or 2 wherein at least one of said propylene polymer or polymers is a propylene copolymer of propylene and one or more of 4-methyl-1-pentene, 1-hexene or 1-octene.

6. The composite fabric of claim 1 or 2 wherein said first and said second layers are thermally bonded.

7. The composite fabric of claim 1 or 2 wherein said first and said second layers are adhesively laminated.

8. The composite fabric of claim 7 wherein said adhesive is selected from the group consisting of a hot melt adhesive, a water based adhesive, and a polyolefin polymer.

9. The composite fabric of claim 1 wherein at least one of said polymers of said first layer or said polymer of said second layer is selected from the group consisting of a propylene homopolymer, a propylene copolymer, an ethylene homopolymer, an ethylene copolymer and combinations thereof.

* * * * *